(12) United States Patent
Kostiuk et al.

(10) Patent No.: US 11,257,381 B2
(45) Date of Patent: Feb. 22, 2022

(54) SYSTEM AND METHOD TO SIMULTANEOUSLY DISPLAY AN AIRPORT STATUS SNAPSHOT PANE AND A PRIMARY MAP PANE TO CLEARLY INDICATE TERMINAL AIRSPACE RISK CATEGORY

(71) Applicant: Robust Analytics, Inc., Crofton, MD (US)

(72) Inventors: Peter F Kostiuk, Crofton, MD (US); Hugo Kang, Crofton, MD (US); Michael Mohen, Crofton, MD (US); Varun Sudarsanan, Crofton, MD (US)

(73) Assignee: ROBUST ANALYTICS, INC., Crofton, MD (US)

( * ) Notice: Subject to any disclaimer, the term of this patent is extended or adjusted under 35 U.S.C. 154(b) by 0 days.

(21) Appl. No.: 16/748,321

(22) Filed: Jan. 21, 2020

(65) Prior Publication Data
US 2021/0225177 A1    Jul. 22, 2021

(51) Int. Cl.
G08G 5/00    (2006.01)
G06F 3/0482    (2013.01)
G01S 7/06    (2006.01)

(52) U.S. Cl.
CPC .............. G08G 5/0043 (2013.01); G01S 7/06 (2013.01); G06F 3/0482 (2013.01); G08G 5/0026 (2013.01)

(58) Field of Classification Search
CPC ..... G08G 5/003; G08G 5/0043; G08G 5/0095
See application file for complete search history.

(56) References Cited

U.S. PATENT DOCUMENTS

| | | | |
|---|---|---|---|
| 6,940,426 B1* | 9/2005 | Vaida | G08G 5/0039 340/963 |
| 10,229,604 B1 | 3/2019 | Mogford et al. | 715/758 |
| 2019/0103031 A1* | 4/2019 | Evans | G08G 5/0013 |

OTHER PUBLICATIONS

Nikoleris, Anastasios, and Heinz Erzberger. "Autonomous system for air traffic control in terminal airspace." 14th AIAA Aviation Technology, Integration, and Operations Conference. (Year: 2014).*

* cited by examiner

*Primary Examiner* — Thomas G Black
*Assistant Examiner* — Ana D Thomas
(74) *Attorney, Agent, or Firm* — Stein IP LLC

(57) ABSTRACT

A system, a method, and a computer program embodied on a non-transitory computer-readable medium, the program configured to cause at least one processor to perform steps including gathering observations and forecasts of a plurality of aviation environmental and operational data of a terminal airspace, independently transforming the observations and forecasts into respective terminal airspace risk factors; integrating the terminal airspace risk factors into operational time periods; weighting the integrated terminal airspace risk factors into an overall airspace risk score for each operational time period; categorizing the overall airspace risk score into a terminal airspace risk category based upon at least one predetermined risk score threshold; and displaying the risk categories and selected underlying risk factors data on a map with a plurality of display panes.

28 Claims, 16 Drawing Sheets

SYSTEM AND METHOD TO SIMULTANEOUSLY DISPLAY AN AIRPORT STATUS SNAPSHOT PANE AND A PRIMARY MAP PANE TO CLEARLY INDICATE TERMINAL AIRSPACE RISK CATEGORY

STATEMENT OF GOVERNMENT INTEREST

This invention was made with Government support under contract 80NSSC18C0122 awarded by NASA. The Government has certain rights in the invention.

BACKGROUND OF THE INVENTION

Aspects of the present invention generally pertain to aviation risk prediction and mitigation, and more specifically, to an analytical method and tool that assists airline dispatchers, pilots, and air traffic controllers and other professionals in identifying and predicting risks to flight operations in the terminal airspace areas around airports.

DESCRIPTION OF THE RELATED ART

The airspace area around airports (hereafter referred to as the terminal airspace) can be a major source of risk in flight operations. Weather, high traffic volume, and limited runway capacity combine to move aircraft close to each other, often with limited or no visibility. Airport infrastructure outages, such as for the runway or instrument landing systems, require pilots and controllers to follow different procedures with potential changes in operational risks. Decades of aviation safety research have identified several risk factors that contribute to crashes and other risk events, yet no system or tool is available that monitors these risk factors jointly to identify and predict changes in the risk category (status) of airport area flight operations. Accordingly, a tool that predicts the risk category, or margin of safety, for terminal airspace flight operations could reduce the number of accidents and incidents, while improving operational predictability and efficiency.

In conducting air traffic control operations, the Federal Aviation Administration identifies higher risk in high altitude sectors when the number of aircraft predicted to operate in that sector in a 15-minute time period (epoch) exceeds a capacity threshold set by air traffic experts. A sector predicted to have more aircraft than a threshold is said to be "going red" and air traffic managers will undertake mitigating actions to reduce traffic to a lower level. Unfortunately, there is no similar "going red" predictive capability for terminal airspace operations. The reasons for this lack of predictive capability are many, including the greater complexity of the operational environment, the higher number of possible risk factors, and the data required to build a comprehensive understanding of the overall situation have been either unavailable or published irregularly and at different time intervals, making it difficult to develop and deploy a prognostic risk tool. Airline dispatchers are also concerned about terminal area risks when they prepare flight plans, but they also lack the tools to predict when a destination airport region might transition to a higher risk category. The National Aeronautics and Space Administration has begun a large, multi-year, multi-million dollar research project designed to develop methods to provide airspace users with a terminal airspace safety monitoring system. Aspects of the current invention address this shortfall by fusing information on multiple risk factors, predicting their future risk scores, and applying predictive algorithms that combine observations on the plurality of risk factors into an overall airspace risk score to determine a terminal airspace risk category, which is a prediction of the risk state/status of the terminal airspace. Aspects of this invention include an analytical method to gather and process data on multiple risk factors, predict the terminal airspace risk category of the terminal airspace based on forecasts of those risk factors, and a software implementation that processes and displays the terminal airspace risk category and underlying data in a useful way to air traffic controllers, airline dispatchers, and other aviation professionals.

SUMMARY OF THE INVENTION

Certain embodiments of the present invention may provide solutions to the problems and needs in the art that have not yet been fully identified, appreciated, or solved by conventional flight planning and air traffic management technologies. For example, some embodiments of the present invention pertain to a software tool that assists airline dispatchers and controllers to identify and predict potential changes in a terminal airspace category.

In an embodiment of the invention, algorithms input data from multiple sources and time intervals to forecast the risk category (state/status) of a terminal airspace at discrete future time intervals. The data inputs pertain to potential terminal airspace risk factors identified in aviation safety research as contributing factors in aircraft crashes and hazardous events. Data inputs arrive at various intervals. Some data, such as traffic volume, arrive continuously in an ever-changing flow. Other data, including weather forecasts, arrive periodically but may also change outside of normal schedules. Other data, such as on runway closures or equipment outages, may be scheduled days or weeks in advance, or occur suddenly with no prior warning. As all of these factors contribute to flight risks and may interact in negative ways, the algorithms process the data inputs to aggregate them into consistent and meaningful time intervals, and other algorithms use the processed data inputs to forecast the terminal airspace risk category. Those forecasts may then be used by aviation professionals to take actions to mitigate or avoid possible risks.

In an embodiment, a computer program is embodied on a non-transitory computer-readable medium. The program is configured to cause at least one processor to display a plurality of interactive panes providing information pertinent to flight risk to flight operators and air traffic managers in a terminal airspace, the airspace surrounding an airport. The plurality of interactive panes include a primary map pane, an airspace status dashboard showing predicted risk status in defined time intervals, or epochs, over a forecast period, and map overlays to provide the user with data and visual insights into individual risk factors.

In another embodiment, a computer-implemented method includes displaying, by a computing system, a plurality of interactive panes providing information pertinent to an individual airport and risks in the surrounding airspace. The plurality of panes include a primary map pane, an airspace status dashboard pane showing predicted airspace risk status in defined time periods, and map overlays to provide the user with data and visual insights into individual risk factors. The primary map pane includes a geographic map of the terminal airspace and a menu of options for displaying risk factor observations and other pertinent information, including predicted arrival traffic forecasts by arrival sector, predicted departure traffic forecasts by departure sector, probabilities of convective weather affecting sector operations, weather radar images, significant meteorological events (SIGMETS), special use airspace (SUA), current airborne aircraft positions, current and recent wind speed and direction on the airport surface, or any combination thereof. A messaging pane provides a pop-up alert to a user when certain risk conditions are present.

In yet another embodiment, a computer program is embodied on a non-transitory computer-readable medium. The computer program displays a plurality of interactive panes providing information pertinent to individual airports and surrounding airspace risks. The plurality of panes include a primary map pane, an airspace status dashboard pane showing a predicted airspace risk category in defined time periods, and map overlays to provide the user with visual insights into risk factors. The primary map pane includes a geographic map of the terminal airspace and a menu of options for displaying risk factors, including arrival traffic forecasts by arrival sector, departure traffic forecasts by departure sector, convective weather probabilities of affecting sector operations, weather radar images, SIGMETS, SUAs, airborne aircraft positions, current and recent wind speed and direction on the airport surface, or any combination thereof. A messaging pane provides a pop-up alert to a user when certain risk conditions are present. When the application alerts the user that an information update is available, the user may activate the update feature, causing the application to update risk factor forecasts and refresh the map display with the new information. In other embodiments, updates occur automatically when input data change.

In yet another embodiment, a computer program is embodied on a non-transitory computer-readable medium. In another embodiment, a computer-implemented method includes displaying, by a computing system, a plurality of interactive panes providing information pertinent to individual airports and surrounding airspace risks. The plurality of panes include a primary map pane, an airspace status dashboard pane showing predicted risk category in defined time periods, and map overlays to provide the user with visual insights into risk factors in a single display screen. The primary map pane includes a geographic map of the terminal airspace and a menu of options for displaying risk factors such as arrival traffic forecasts by arrival sector, departure traffic forecasts by departure sector, convective weather probabilities of affecting sector operations, weather radar images, SIGMETS, SUAs, airborne aircraft positions, current and recent wind speed and direction on the airport surface, or any combination thereof. A messaging pane provides a pop-up alert to a user when certain conditions are present. The user can select an option to display on the map the current and planned aircraft positions, with a filter to choose to display arriving and departing aircraft from the selected airport, or a subset of the flights by airline, destination airport, and/or origin airport.

In yet other embodiments, there is a system, a method, or a computer program embodied on a non-transitory computer-readable medium, the program configured to cause at least one processor to perform steps including gathering observations of a plurality of aviation environmental and operational data of a terminal airspace, independently transforming the observations into respective terminal airspace risk factors; integrating the terminal airspace risk factors into operational time periods; weighting the integrated terminal airspace risk factors into an overall airspace risk score for each operational time period; and categorizing the overall airspace risk score into a terminal airspace risk category based upon at least one predetermined risk score threshold.

BRIEF DESCRIPTION OF THE DRAWINGS

In order that the advantages of certain embodiments of the invention will be readily understood, a more particular description of the invention briefly described above will be rendered by reference to specific embodiments that are illustrated in the appended drawings. While it should be understood that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE EMBODIMENTS

Figure 1:
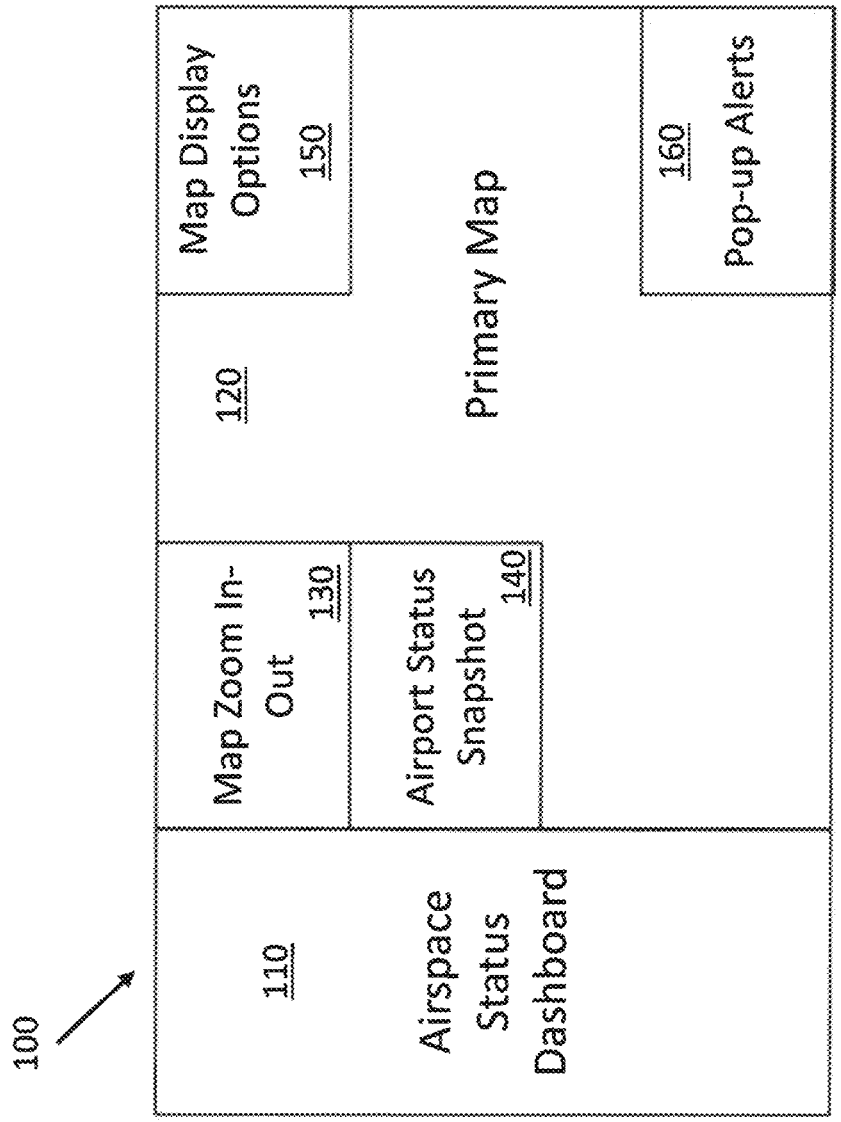
FIG. 1 is an architectural diagram illustrating a screen layout of an airspace safety margin evaluation tool (ASMET), according to an embodiment of the present invention.

Some embodiments of the present invention pertain to a tool that assists air traffic managers, airline dispatchers, air traffic controllers, and other professionals in managing aircraft and airports. Some embodiments to the ASMET may gather recent, current, and forecasted information on weather, traffic volumes, infrastructure outages such as runways and instrument landing systems (ILS), and runway configurations and air traffic procedures and any other suitable information and display it on a screen. ASMET may also include predictive analytics that use the information gathered to predict the future risk status of the terminal airspace several hours in advance. In another embodiment, ASMET can be used by air traffic managers to alert them of developing risks and act to reduce risk and mitigate the chances of operational disruptions. In another embodiment, ASMET can be used by airline dispatchers to identify the need to modify flight plans and schedules to avoid higher risk sectors and time periods, thereby increasing safety and reducing the possibility of re-routing aircraft, with the associated increased flying time, fuel consumption, and emissions. In another embodiment, ASMET can be used by pilots to obtain better situation awareness before entering an airspace.

In some embodiments, ASMET may reduce delays and excess flight times by improving situation awareness among airline dispatchers, air traffic managers, pilots, and air traffic controllers. For instance, ASMET may predict when multiple risk factors will be present and an increase in safety risks to aircraft operating in the airspace exists. Although a single risk factor may be safely managed, many aircraft crash investigations conclude that the joint impact of multiple, simultaneous risk factors may degrade safety or cause procedural changes that increase flight times, generate cancellations and diversions, and increase pilot and controller workloads. Unnecessary delays and re-routings may be prevented by having better forecasts of the onset and duration of risky airspace episodes. For example, if airline staff have accurate information on when an arrival sector will likely be disrupted by the presence of convective weather, high arrival traffic volumes, and reduced arrival capacity due to low ceiling and visibility, they may propose a departure delay or an alternative flight path to a different, less impacted arrival sector. Some of these embodiments may assist with scheduling arrival flows into the terminal area by the air traffic managers at the Federal Aviation Administration (FAA) Air Route Traffic Control Center (ARTCC) or the Air Traffic Control System Command Center (ATCSCC). Other embodiments may assist airline dispatchers to schedule arrivals to the affected airport in order to reduce downstream flight delays and passenger impacts. With access to an ASMET embodiment by multiple stakeholders, common situation awareness can facilitate more effective management of disruptions during high and medium risk periods.

FIG. 1 is an architectural diagram illustrating a screen layout of a safety margin evaluation application, according to an embodiment of the present invention. A layout 100 is divided into two major display panels, an airspace status dashboard pane 110 and a primary map pane 120, with optional map overlays 130, 140, and 150, and a popup alert 160. Airspace status dashboard pane 110 displays the current terminal airspace risk category in 15-minute intervals, or epochs, for the next four (or however many predetermined number of) hours. The primary map pane 120 may display airports, weather, predicted traffic, and other relevant information. The map zoom in-out feature 130 allows the user to expand and contract the map display and move around the map with a cursor or other display control device. The airspace status dashboard 140 shows the time period, runway status, instrument landing system status, cloud base (or ceiling) in feet above ground level, and visibility in statute miles. As is shown, the airspace status dashboard pane 110 and the primary map pane 120 are simultaneously displayed for ease of use and practicality for user, enabling accurate and quick decisions to be made.

Figure 2:
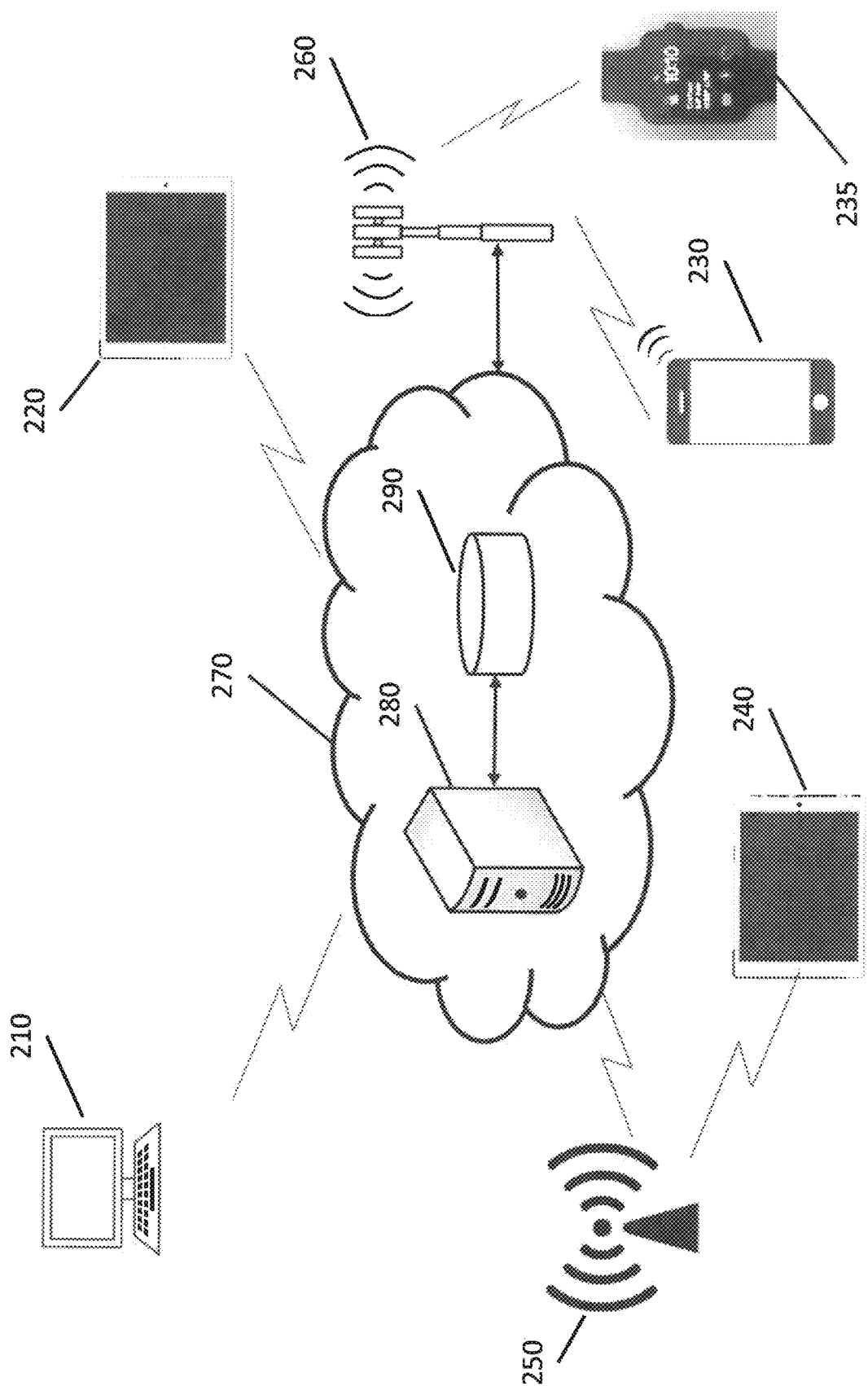
FIG. 2 is an architectural diagram illustrating a network configured to implement ASMET applications, according to an embodiment of the present invention.

FIG. 2 is an architectural diagram illustrating a network 200 configured to implement ASMET applications. A network 200 includes a workstation 210 with a display monitor, an airborne tablet computer 220, a smartphone 230, a ground-based tablet computer 240, a wi-fi transmitter 250, a cellphone tower 260, the internet 270, a server 280, and a database 290. While the communications here are shown as wireless and wired, in some embodiments, different wireless and wired communication configurations may be used for one or more communication links. Also, Ethernet, W-Fi, Bluetooth, cable, any other suitable communications technology, or any combination thereof, may be used for communication links without deviating from the scope of the invention. Any local area network (LAN), wide area network (WAN), satellite, cellular, or Internet technology may be used supplemental to, or in place of, the network depicted herein.

Users of the workstation 210, airborne tablet computer 220, smartphone 230, ground-based tablet computer 240, wi-fi transmitter 250, (for example, air traffic managers, airline dispatchers, air traffic controller, pilots, ground services crew, airport managers, and other aviation professionals) use an ASMET client application operating thereon. The ASMET application may be customized for the specific hardware capabilities, operating system, display constraints, etc., of each device. In FIG. 2, the workstation 210, airborne tablet computer 220, smartphone 230, ground-based tablet computer (perhaps a smart watch) 240, and ground-based tablet computer 250 communicate with the Internet 270 via a telecommunication network, which may be any suitable telecommunication network, such as those of any currently available commercial carrier or combination of carriers. The telecommunications network may utilize any suitable standards and technologies, such as TCP/IP, 3G, 4G, 5G, etc. For the sake of convenience, the details of the telecommunications network are not shown, and the details of the Internet 270 are not shown here, but may have any desired architecture without deviating from the scope of the invention.

Within or otherwise accessible by the Internet 270 is the server 280 that runs a server-side implementation of the ASMET application. For instance, the server-side ASMET application may gather pertinent air traffic information, weather information, status of air traffic control information, airport configuration information, information from users, etc., and store them in the database 290. The server-side ASMET application may gather pertinent air traffic information, weather information, status of air traffic control information, airport configuration information periodically and send updates to the workstation 210, airborne tablet computer 220, smartphone 230, ground-based tablet computer 240, and wi-fi transmitter 250. The server-side ASMET application may also push alerts from the application to client-side ASMET application of a user, group of users, or all users, when they are generated by the ASMET server-side application. The server-side ASMET application may also push communications and alerts from a user to another client-side ASMET application user, group of users, or all users.

Data may be provided to the server-side ASMET application by a variety of sources, including but not limited to, web services from the National Oceanographic and Atmospheric Administration (NOAA), Aviation Weather Service (AWC), the Federal Aviation Administration (FAA) System Wide Information Management (SWIM) data feed, the Notices to Airmen (NOTAMs), etc. These data are collected and transformed through a software application, and used as inputs to algorithms that identify risk category and forecast future risk categories. The data and analytical outputs may then be presented to users through the client-side ASMET user interface.

Figure 3:
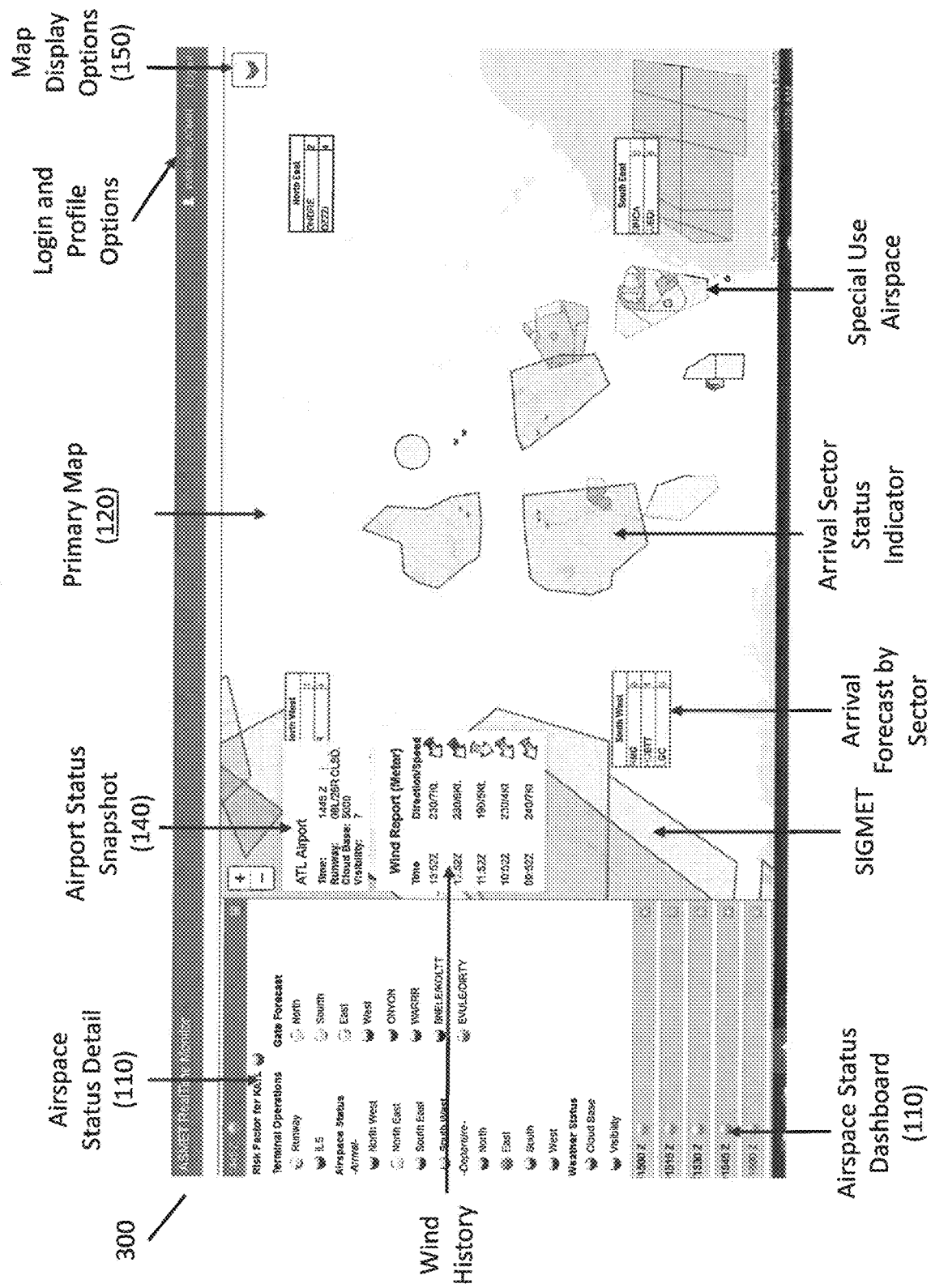
FIG. 3 is a screenshot illustrating a primary map pane, according to an embodiment of the present invention.

FIG. 3 is a screenshot illustrating a client-side ASMET application screenshot 300, according to an embodiment of the present invention. As with FIG. 1, the display of the ASMET application screenshot 300 is divided into the airspace status dashboard pane 110 and the primary map pane 120, with optional overlays map zoom in-out feature 130 (as shown in FIG. 1), airport status dashboard 140, map display options 150, and pop-up alerts 160. The Screenshot 300 shows the primary map for the selected airport, ATL, risk status indicator for each epoch, detailed airspace risk status for a selected epoch (1445Z), runway and ILS status, wind speed and direction history, traffic forecast for each arrival sector, SIGMET overlay, SUA overlay, and arrival sector risk category indicator.

In FIG. 3, the client-side ASMET application screenshot 300 offers aviation professionals a unique custom display focused on the presentation of information pertinent to terminal airspace risk. Displays and applications currently used by controllers and dispatchers focus exclusively on the operational functions of the job and do not provide a comprehensive assessment or picture of the safety situation of the terminal airspace. Terminal area controllers focus on maintaining required aircraft separation and an efficient flow of aircraft to the runways. Dispatchers generate flight plans using some of the information shown in FIG. 3, but the data arrive from different sources, at different times, and are not integrated on a single screen to provide comprehensive and useful situation awareness for safety purposes. Furthermore, there are no services that synthesize the diverse data sources and perform the predictive analytics to provide the risk category indicators as shown in the airspace status dashboard pane 110. In an embodiment, a user could launch the client-side ASMET application, minimize its display on the monitor, and not look at the display again until receiving an alert from the application that a risk state had changed. This process minimizes the need for display space under normal conditions, while providing alerts and immediate access to detailed airspace risk data when needed.

Figure 4:
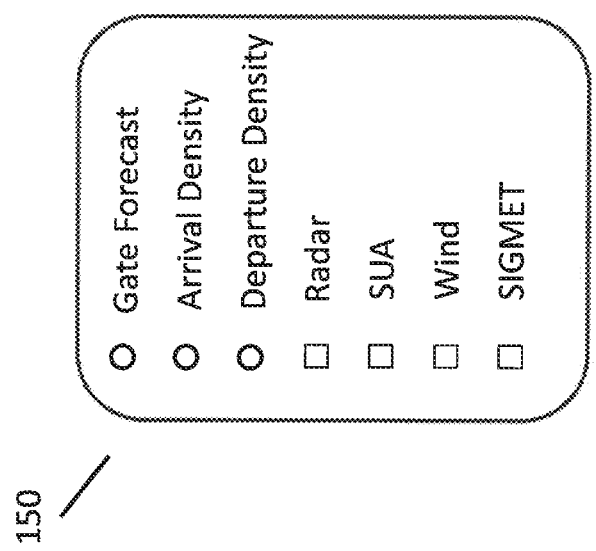
FIG. 4 is a screenshot illustrating primary map overlay options, according to an embodiment of the present invention.

FIG. 4 is a screenshot illustrating map display options 150 for the primary map pane 120 according to an embodiment of the present invention. Users of a client-side ASMET application choose whether to display the information on the primary map pane 120.

As shown in FIG. 4, the map display options 150 for the primary map pane 120 include a clickable Gate Forecast button (Gate Forecast) that causes airspace sectors to be displayed, color-coded to indicate the probability of disruption from convective weather, a clickable Arrival Traffic button (Arrival Density) that causes a table with predicted aircraft traffic for arrival sectors to be displayed, and a clickable Departure Traffic button (Departure Density) that causes a table with predicted departing aircraft counts for departure sectors to be displayed.

The map display options 150 for the primary map pane 120 further include a clickable wind button (Wind) that causes recent reports of airport ground wind speed and direction information to be displayed as the at least one map overlap, a clickable special air space (SUA) button that causes SUA polygons to be displayed, a clickable significant meteorological event (SIGMET) button that causes SIGMET polygons to be displayed, and a clickable weather radar button (Radar) that causes weather radar images to be displayed.

Figure 5:
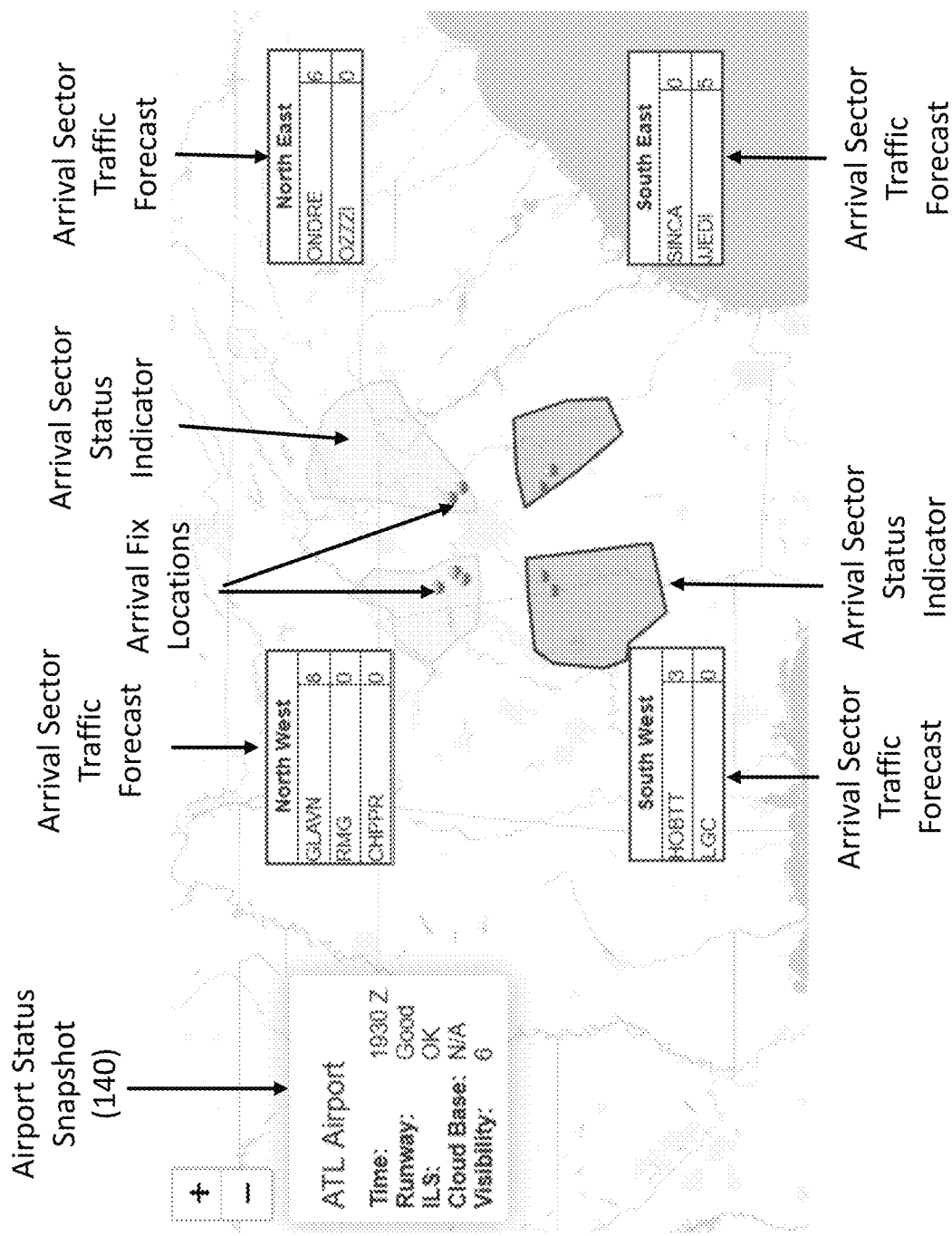
FIG. 5 is a screenshot illustrating another view of the primary map pane, showing a forecast of arrival traffic in a 15-minute window by arrival sector, according to an embodiment of the present invention.

FIG. 5 is a screenshot illustrating map display options 150 according to an embodiment of the present invention. FIG. 5 shows arrival traffic forecast by sector, with color-coded sectors to depict sector risk status of the traffic density risk factor. Using algorithms based on historical data analysis, the server-side ASMET application forecasts arriving traffic over waypoints in 15 minute epochs as one of the risk factor observations to identify and predict terminal airspace risk category. In one embodiment, risk category (state/status) of the traffic density risk factor in a sector is identified as low (green), moderate (yellow), or high (red) based on the predicted number of arriving aircraft during the 15-minute interval.

Figure 6:
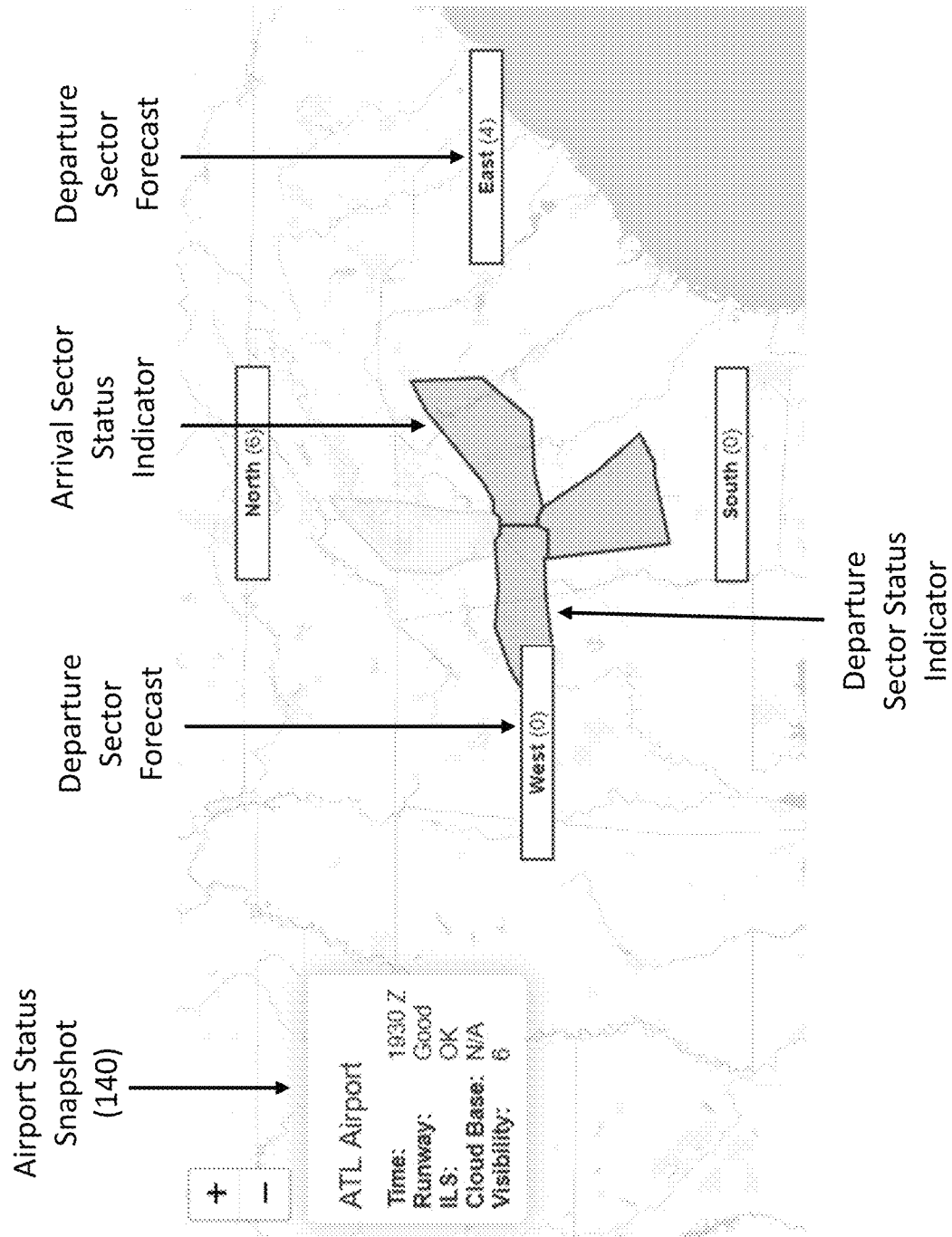
FIG. 6 illustrates a screenshot of the primary map pane, showing a forecast of departure traffic in a 15-minute window by departure sector, according to an embodiment of the present invention.

FIG. 6 is a screenshot illustrating map display options 150, according to an embodiment of the present invention. FIG. 6 shows departure traffic forecast by sector, with color-coded sectors to depict the category of the traffic density risk factor for each sector. Using algorithms based on historical data analysis and analysis of flight plans in the FAA SWIM data feed, the server-side ASMET application identifies and predicts a departure sector risk category based on forecasts of departing traffic transiting the sector in 15 minute epochs. Risk category is identified as low (green), moderate (yellow), or high (red) based on the predicted number of aircraft flying through the departure sector during the 15-minute interval. In some embodiments, traffic count thresholds for the three risk categories (low, medium, high) may be modified by the user.

Figure 7:
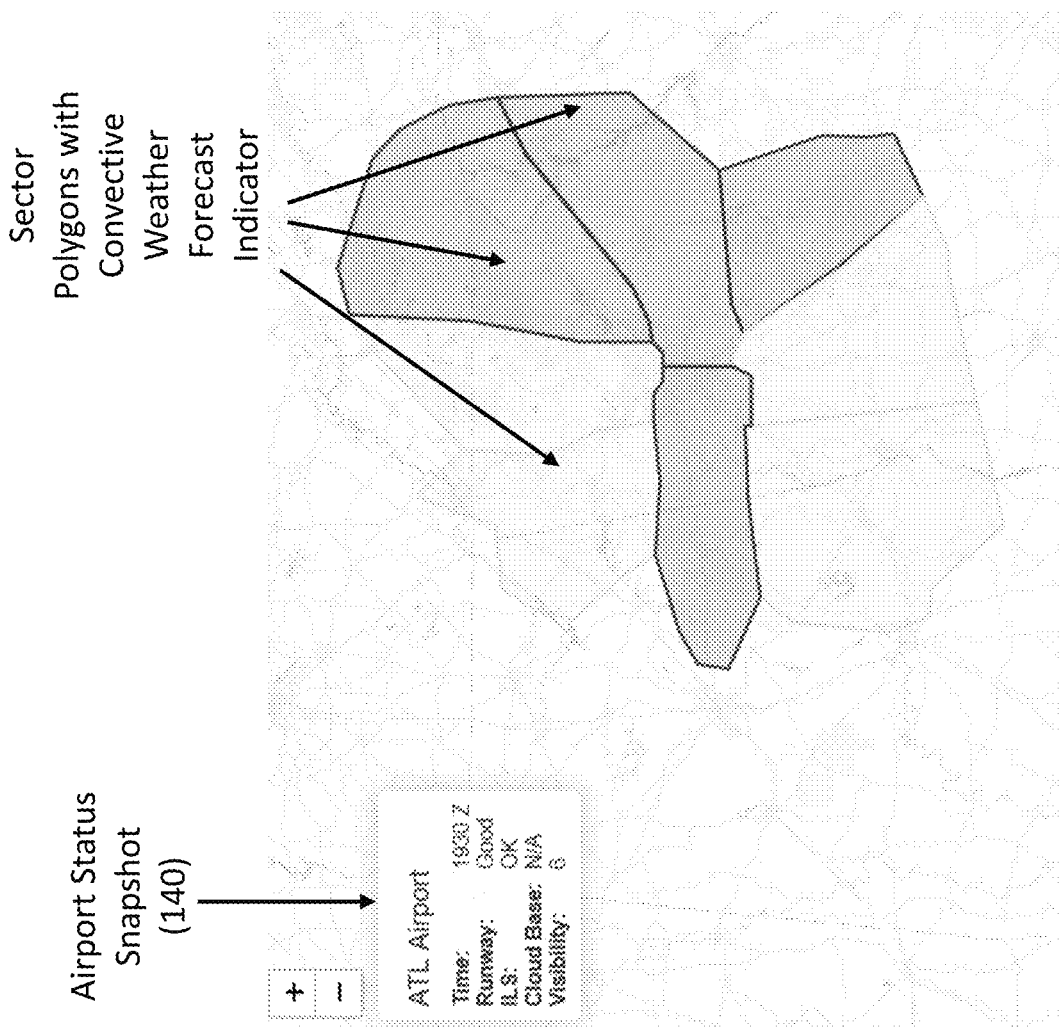
FIG. 7 is a screenshot illustrating an overlay in the primary map pane of predicted disruption risk by sector due to convective weather, according to an embodiment of the present invention.

FIG. 7 is a screenshot of a convective weather risk forecast overlay on the primary map 120, according to an embodiment of the present invention. The four arrival and four departure sectors in the ATL screenshot are displayed as green, yellow, or red based on the predicted probability of disrupting flight operations in the sector attributable to convective weather.

Figure 8:
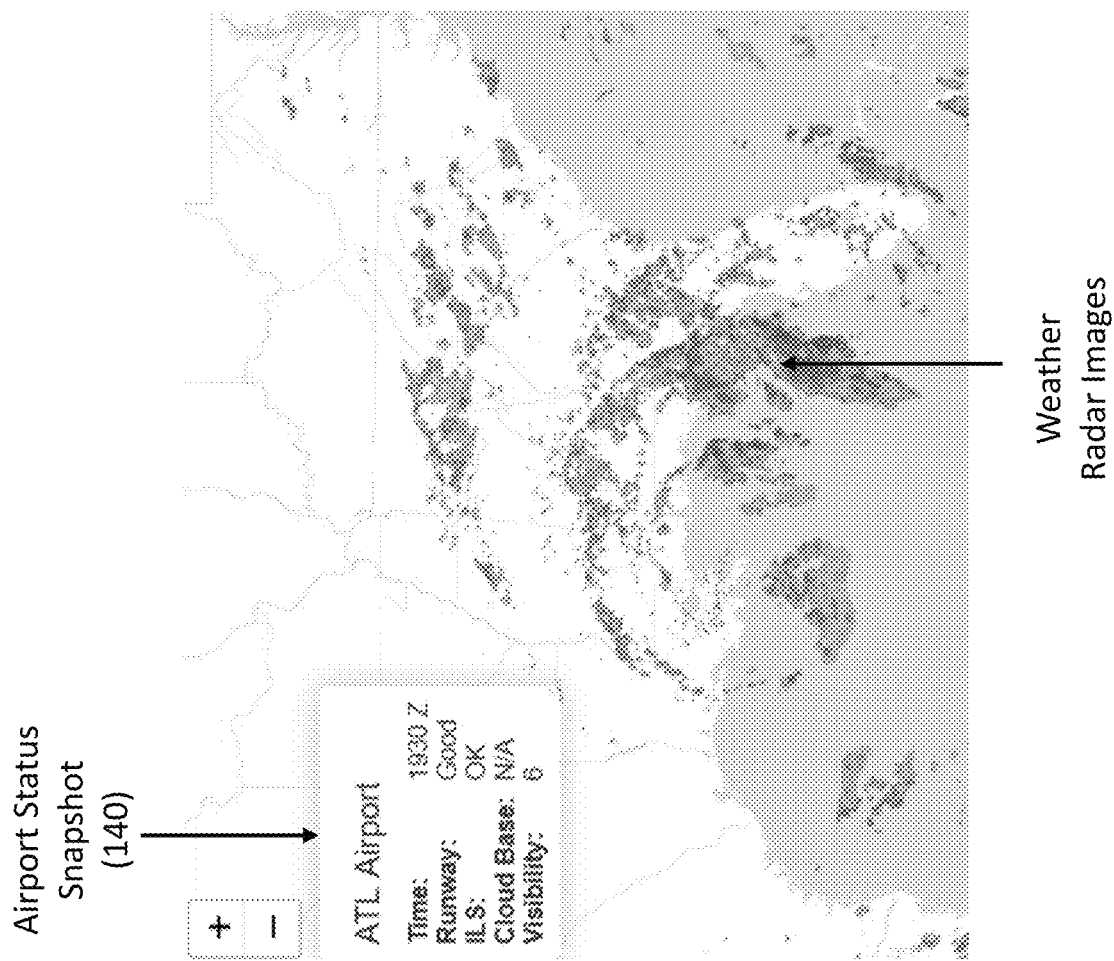
FIG. 8 is a screenshot illustrating an overlay in the primary map pane of recent weather radar, according to an embodiment of the present invention.

FIG. 8 is a screenshot of a weather radar image overlay on the primary map pane 120, according to an embodiment of the present invention. The radar data come from the Aviation Weather Center data feed, as processed by the ASMET server 280 and displayed on an ASMET client-based application.

Figure 9:
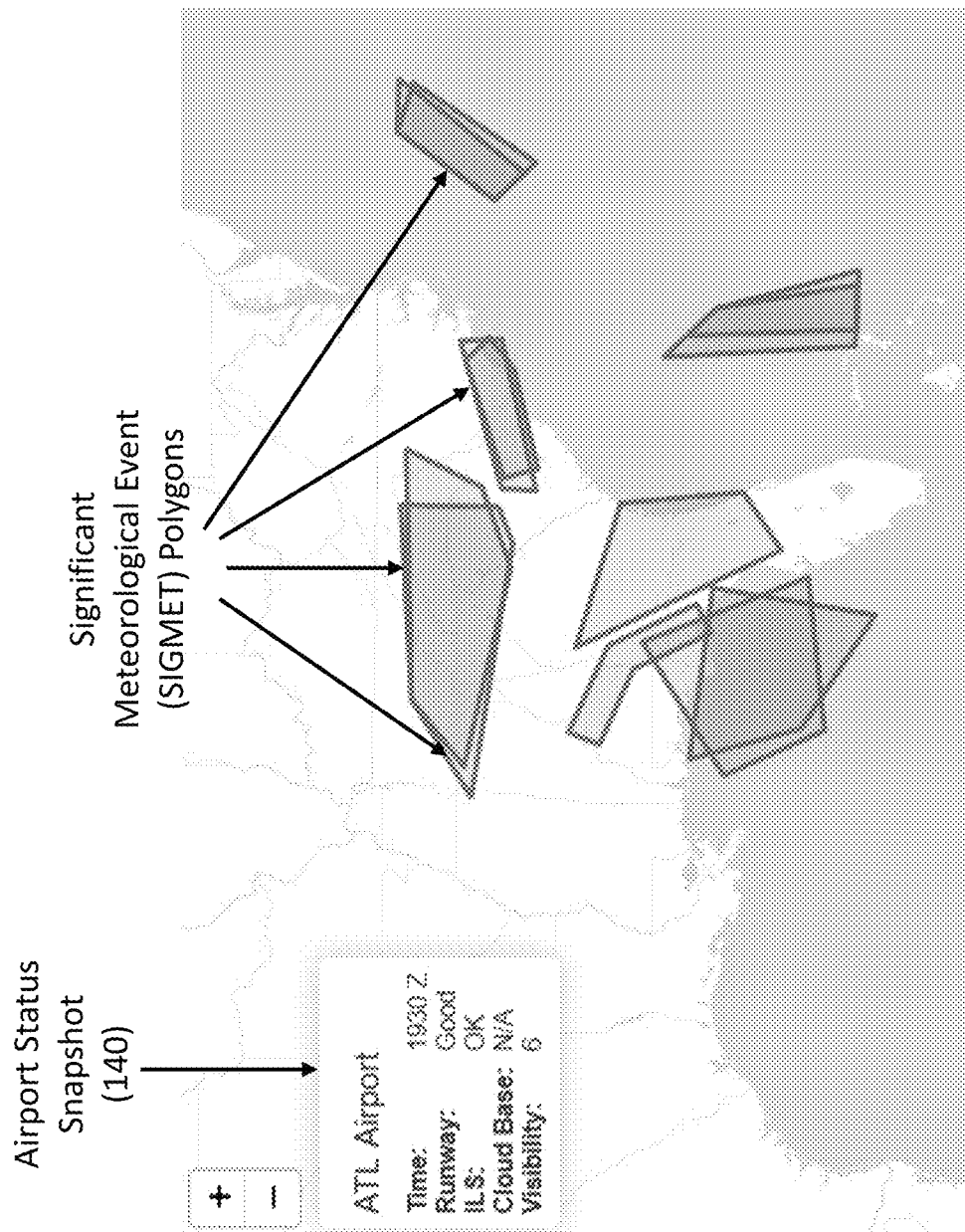
FIG. 9 is a screenshot illustrating an overlay in the primary map pane of current significant meteorological events (SIGMET), according to an embodiment of the present invention.

FIG. 9 is a screenshot of geographically-relevant Significant Meteorological Information (SIGMET), a weather advisory that contains meteorological information concerning the safety of aircraft. SIGMET data are gathered by the ASMET server 280 and processed to enable display on the primary map pane 120. In other embodiments, SIGMET data are processed into polygons and flight plans from SWIM analyzed to identify flights predicted to penetrate the boundary of the SIGMET, and provide an alert to users via the popup alerts (popup alert feature) 160.

Figure 10:
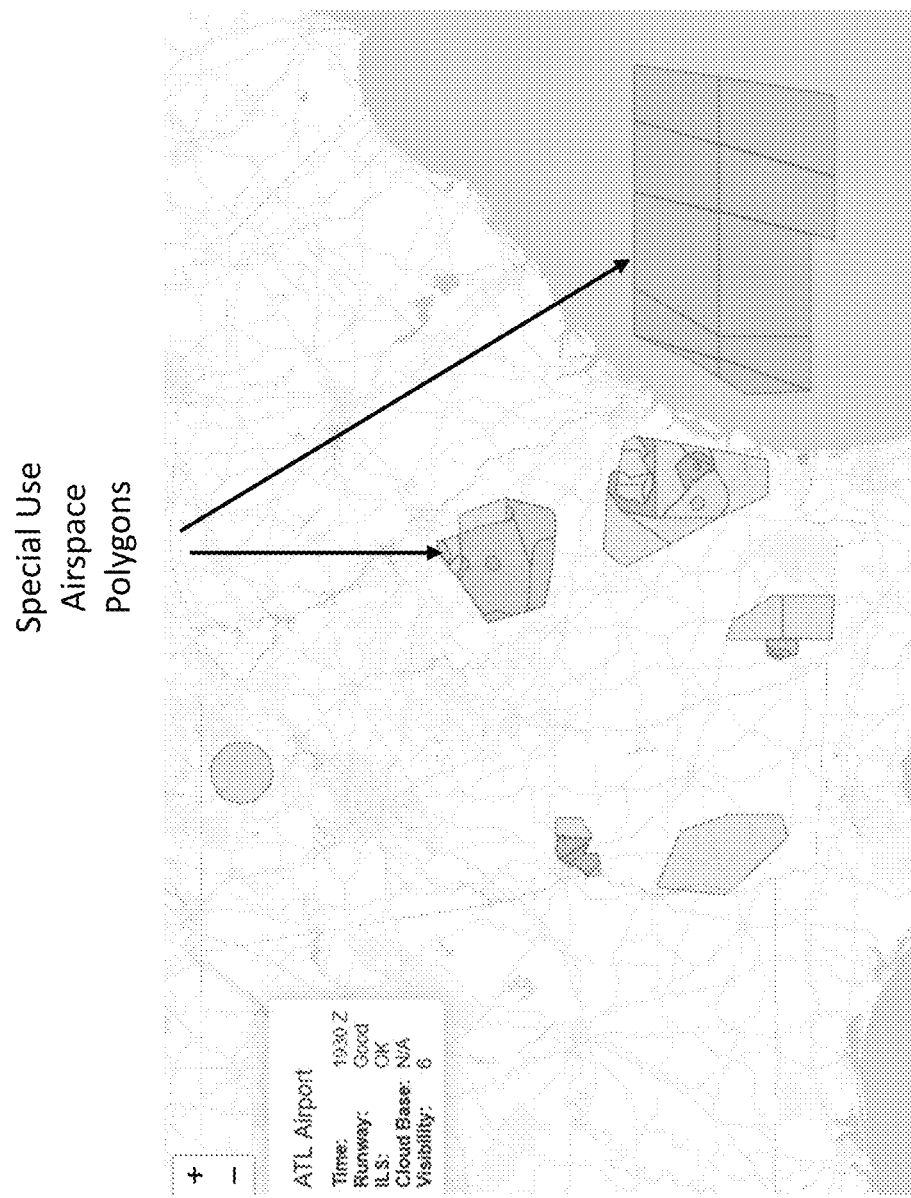
FIG. 10 is a screenshot illustrating an overlay in the primary map pane of Special Use Airspace (SUA), according to an embodiment of the present invention.

FIG. 10 is a screenshot of geographically-relevant Special Use Airspace (SUA), restricted flight zones defined by the FAA. SUA areas, altitudes, and activation times are gathered by the ASMET server 280 and processed to enable display on the primary map pane 120. In other embodiments, SUA data are processed into three dimensional polygons and flight plans from SWIM are analyzed to identify flights predicted to penetrate the boundary of the SUA, and provide an alert to users via the popup alerts 160.

Figure 11:
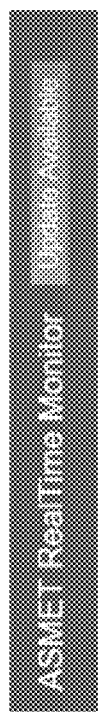
FIG. 11 is a screenshot illustrating an overlay in the primary map pane of the data refresh capability, according to an embodiment of the present invention.

FIG. 11 is a screenshot of the Data Update feature on the primary map pane 120, according to an embodiment of the present invention. In other embodiments, ASMET data are automatically updated and the primary map pane 120 is refreshed periodically with no user action required.

Figure 12:
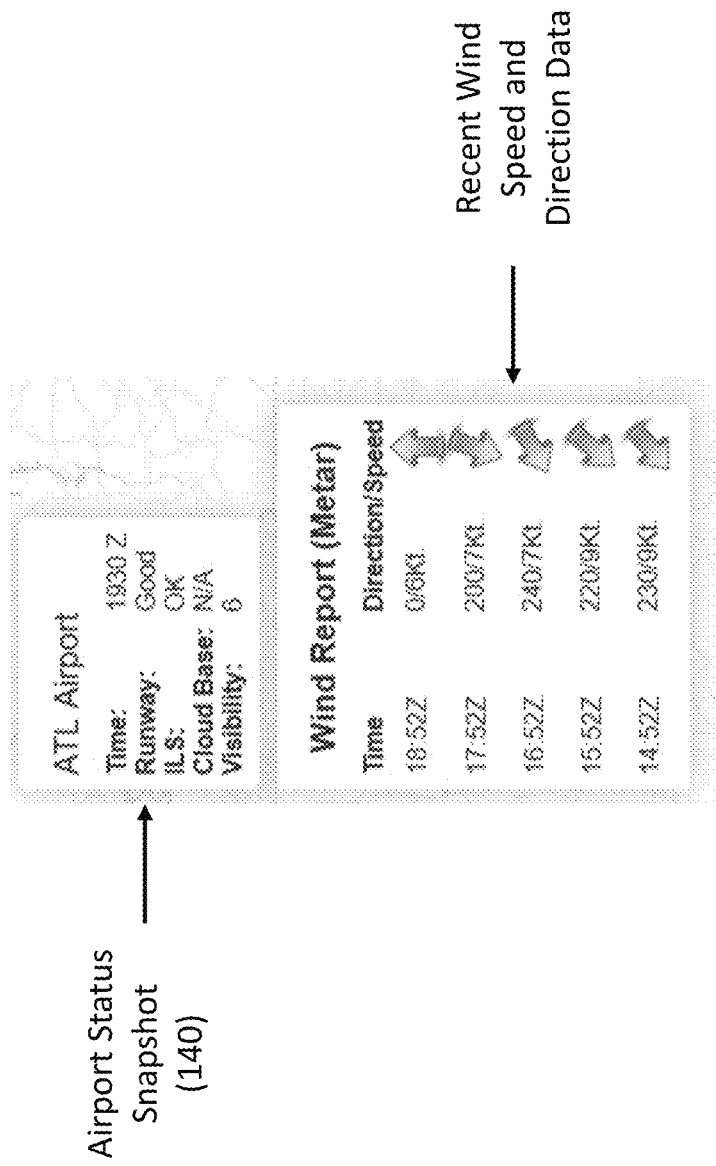
FIG. 12 is a screenshot illustrating an overlay in the primary map pane of current or predicted airport weather, and current and recent wind conditions, according to an embodiment of the present invention.

FIG. 12 is a screenshot of information from the current Terminal Area Forecast (TAF) for the current epoch. These data include, but are not limited to, current cloud base (also referred to as ceiling) and visibility, and recent history of wind speed and direction on the airport surface. For future time periods, predicted values for cloud base and visibility are received from the Terminal Area Forecast and assigned to their appropriate time intervals.

Figure 13:
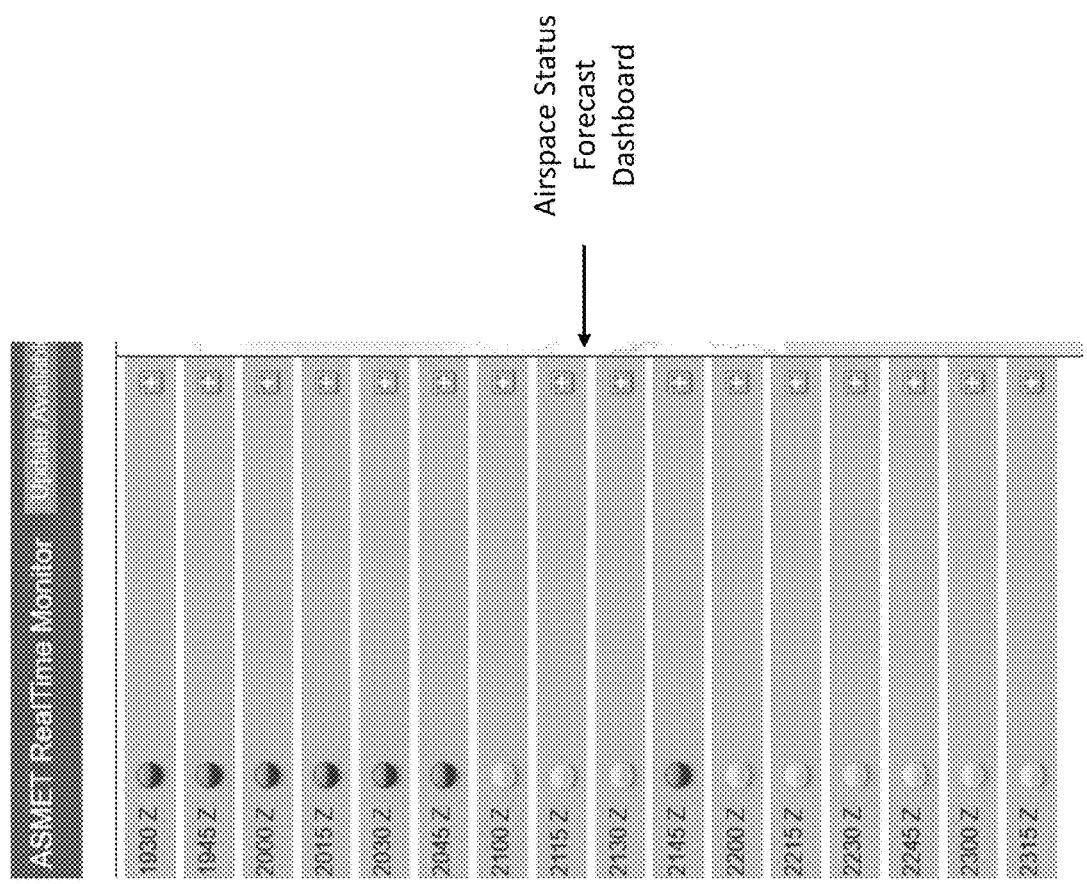
FIG. 13 is a screenshot illustrating an airspace risk dashboard with the predicted airspace risk status in 15-minute epochs, according to an embodiment of the present invention.

FIG. 13 illustrates the airspace status dashboard pane 110. The airspace status dashboard pane shows a predicted terminal airspace risk category for the terminal airspace for each 15-minute epoch for the next four hours. The terminal airspace risk category is predicted by combining a plurality of risk factors in an algorithm that weights each risk factor based on expected contribution to flight risk. Factor weights are aggregated into three risk classifications, following the standard low, medium, high risk categories commonly used in aviation safety assessments. Users may adjust the risk factor weights and classification thresholds based on expert judgment and for different airports. For example, airports that typically experience good weather (high cloud ceiling and high visibility) may assign a higher weight to these risk factors as the controllers and flight crews may not have as much experience operating in those conditions as at other airports. In some embodiments, combinations of risk factors may have stronger effects, such as the loss of ILS may be considered more significant during nighttime hours when low ceilings are present.

In a current embodiment, ASMET uses six risk factors, with four operating for the entire airport (ceiling, visibility, runway outage, ILS outage), and two varying by arrival/departure sector (convective weather impact and traffic density). In this embodiment, there are 20 risk factor observations, two of which are binary (green or red depending on the threshold values), and the others with three possible levels (green, yellow, and red). Points are assigned to each factor's threshold level(s), and summed to estimate the overall airport risk. The airspace status dashboard pane of FIG. 13 displays the predicted terminal airspace risk category of the entire terminal airspace area, based on the predicted risk scores for the individual factors and the output of the algorithm that aggregates the risk factors into an overall airspace risk score for an overall assessment of airspace risk. The overall airspace risk score is compared to a predetermined risk score threshold to determine the terminal airspace risk category. One familiar with the art might consider the situation similar to driving a car, in which the probability of a crash increases when several automotive risk factors are present: rain, darkness, heavy traffic, and a driver talking on a mobile phone. The overall risk may be increased when an inexperienced driver operates the vehicle, or the driver is unfamiliar with the roads.

The airspace status dashboard pane 110 reports output from a suite of algorithms that ingest the risk factor observations and predicts a terminal airspace risk category for each epoch during the forecast period. Embodiments of the invention incorporate two types of data processing and algorithm development. The first stage of data processing transforms the raw observations into variables relevant for aircraft operations. For example, weather radar is more useful when processed and the raw data used to estimate the probabilities that the weather will negatively affect flight operations. Similarly, the FAA makes available nearly all of the flight plans and scheduled departure times for commercial passenger and cargo flights and aircraft operating under instrument flight rules. These data report on about 80-90 thousand flights per day. In a current embodiment, ASMET data processing algorithms intake the flight plans and forecast arrival and departure counts for each airport arrival and departure sector in 15-minute epochs, thereby providing a forecast of traffic density and controller workload. The traffic count in each sector is one of the risk factor observations. One skilled in the art could construct other measures of traffic density and workload as a risk factor.

Embodiments of the invention include algorithms to assign weights to each risk factor observation and aggregate the weights to form an overall airspace risk score. In a current embodiment, risk factor observation weights are summed to risk score totals and classified into a terminal airspace risk category of green, yellow, or red when the overall airspace risk score exceeds the predetermined risk score threshold. The resulting classifications are displayed on the airspace status dashboard pane 120 to provide visibility to an aviation professional user. A current embodiment allows a user to modify the weights assigned to each risk factor observation, and adjust the thresholds for classifying the airspace risk score into airspace risk categories. This option is useful if, for example, an airspace manager assigns a more stringent risk threshold when less experienced controllers are on duty.

In a current embodiment, six risk factors are used: ceiling, visibility, convective weather, runway status, ILS status, and traffic density. These six factors generate 20 observations. Ceiling, visibility, runway status, and ILS status are observed once for the entire airport, while convective weather and traffic density are measured at each of the eight sectors. Each observation is then assigned a state classification based on the thresholds defined for that risk factor. Runway and ILS are binary. Ceiling and visibility are assigned into three categories (states) based on the meteorological condition thresholds values for the airport. Convective weather and traffic density are assigned into three categories based on the defined severity thresholds. In that embodiment, there are six risk factors, 20 risk factor observations, and 58 possible state values.

In other embodiments, probabilistic airspace risk status may be estimated using algorithms that account for forecast uncertainty in the underlying risk factor observations such as weather and unscheduled runway and ILS outages.

Figure 14:
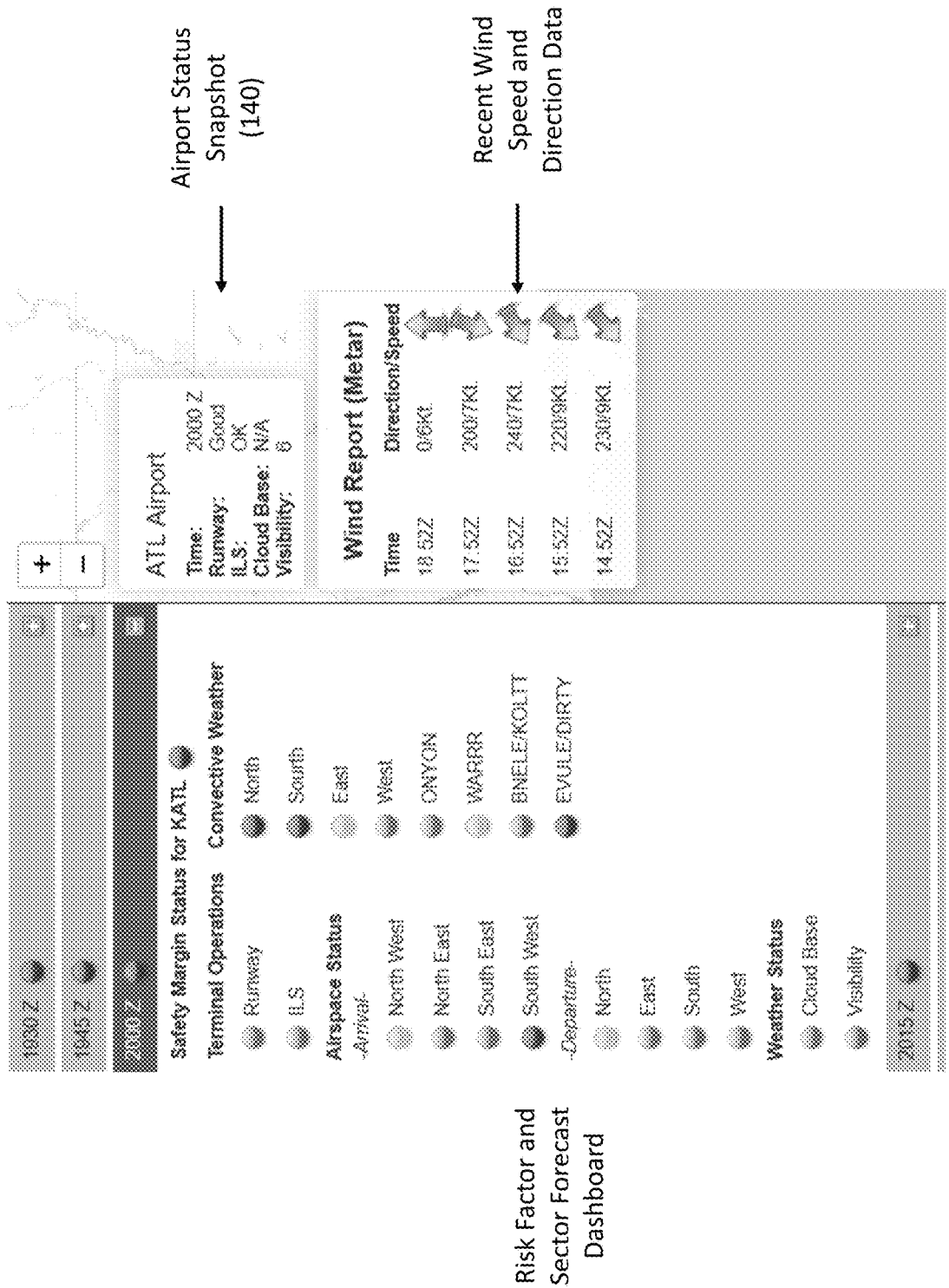
FIG. 14 is a screenshot illustrating the predicted airspace risk status in 15-minute epochs and detailed information for a single epoch, according to an embodiment of the present invention.

FIG. 14 illustrates the detailed risk factor status for one of the epochs. In this example, as several of the risk factors are at high risk, and their joint contribution exceeds the predetermined risk score threshold, the overall terminal airspace risk category is also classified as in a high risk category as indicated by the red circle for that epoch.

The invention is not limited to the risk factors used in a current embodiment. Other embodiments of the present invention can use more or different risk factors. These risk factors may be common across airports (e.g., communications outages or radio frequency congestion) or unique to specific locations, such as dense morning fog at San Francisco International Airport, cross-directional winds at different altitudes, or short-term airspace restrictions for the Washington, D.C. area airports.

Figure 15:
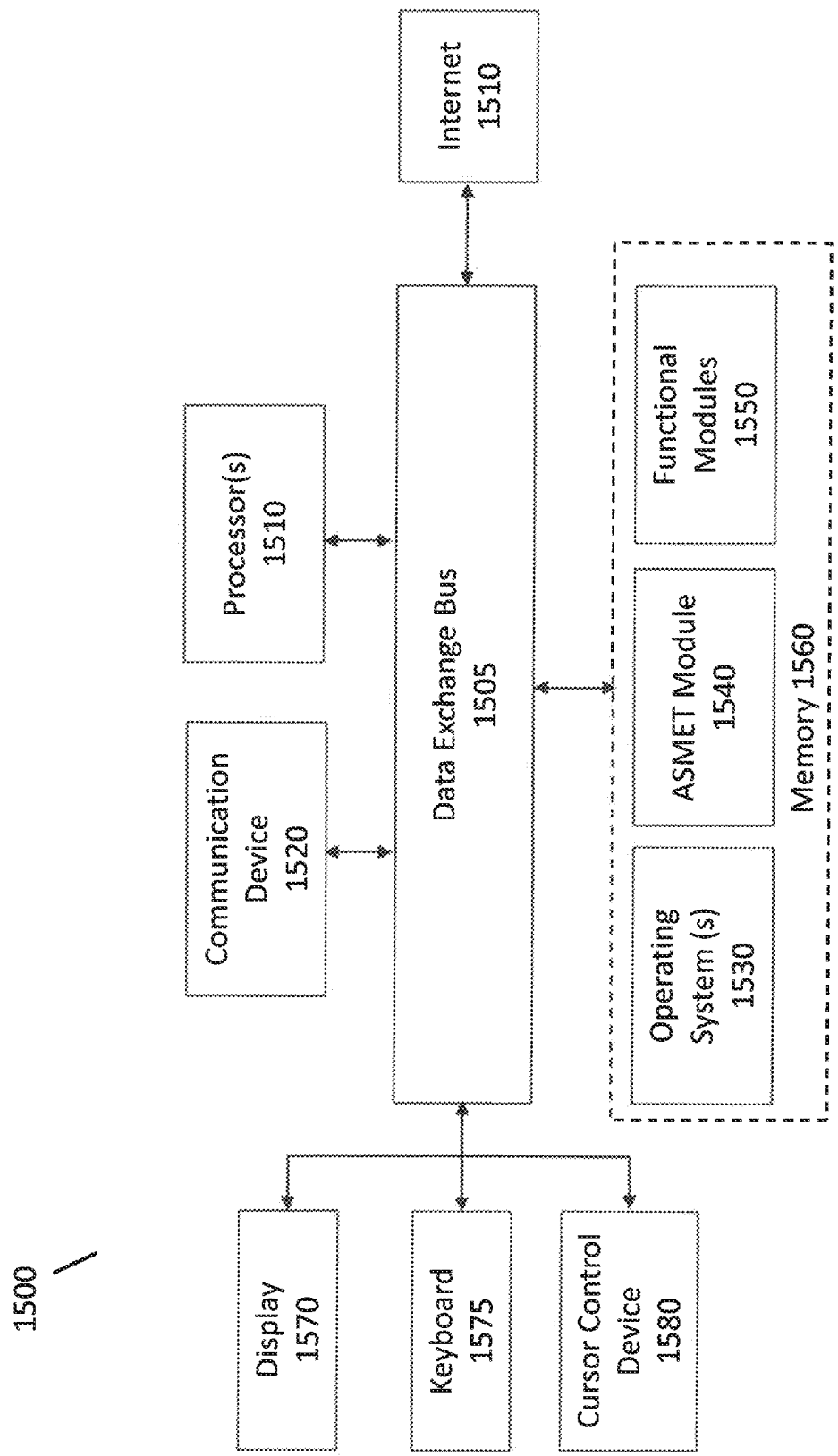
FIG. 15 is a block diagram of a computing system configured to implement an ASMET application, according to an embodiment of the present invention.

FIG. 15 is a block diagram of a computing system 1500 configured to implement an ASMET application, according to a current embodiment of the present invention. The computing system 1500 includes a data exchange bus 1505 or other communication mechanism for transmitting and receiving information, and processor(s) 1510 coupled to data exchange bus 1505 for processing information. The processor(s) 1510 may be any type of general or specific purpose processor, including a central processing unit (CPU) or application specific integrated circuit (ASIC). The processor(s) 1510 may also have multiple processing cores, and at least some of the cores may be configured to perform specific functions. The processor(s) may be distributed in multiple locations, including cloud services. The computing system 1500 also includes memory 1560 for storing information and instructions to be executed by processor(s) 1510. The memory 1560 can be comprised of any combination of random access memory (RAM), read only memory (ROM), flash memory, cache, static storage such as magnetic or optical disk, or any other types of non-transitory computer-readable media or combinations thereof. Additionally, the computing system 1500 includes a communication device 1520, such as a router or transceiver and antenna, to provide wired or wireless access to a communication network.

Non-transitory computer-readable media may be any available media that can be accessed by processor(s) 1510 and may include both volatile and non-volatile media, removable and non-removable media, and communications media. Communication media may include computer-readable instructions, program modules or other data and includes any information delivery media.

The processor(s) 1510 are further coupled via data exchange bus 1505 to a display 1570, such as a Liquid Crystal Display (LCD), for displaying information to a user. A cursor control device 1580, such as a computer mouse, and a keyboard 1575, are further coupled to bus 1505 to enable a user to interface with the computing system 1500. However, in certain embodiments such as those for mobile computing implementations, a physical keyboard and mouse may not be present, and the user may interface with the device solely through display 1570, a touchpad (not shown), touch screen, or voice-enabled control.

The memory 1560 stores software modules that deliver functionality when executed by processor(s) 1510. The modules include an operating system 1530 for the computing system 1500. The modules further include an ASMET module 1540 that is configured to perform ASMET functionality in accordance with the embodiments discussed herein. The computing system 1500 may include one or more additional functional modules 1550 that include additional functionality. In some current embodiments, such a functional module includes a data integration module to implement the substantial data gathering, processing, and integration requirements. Other functional modules include algorithms to analyze historical risk factor data to estimate risk state transition probabilities.

Figure 16:
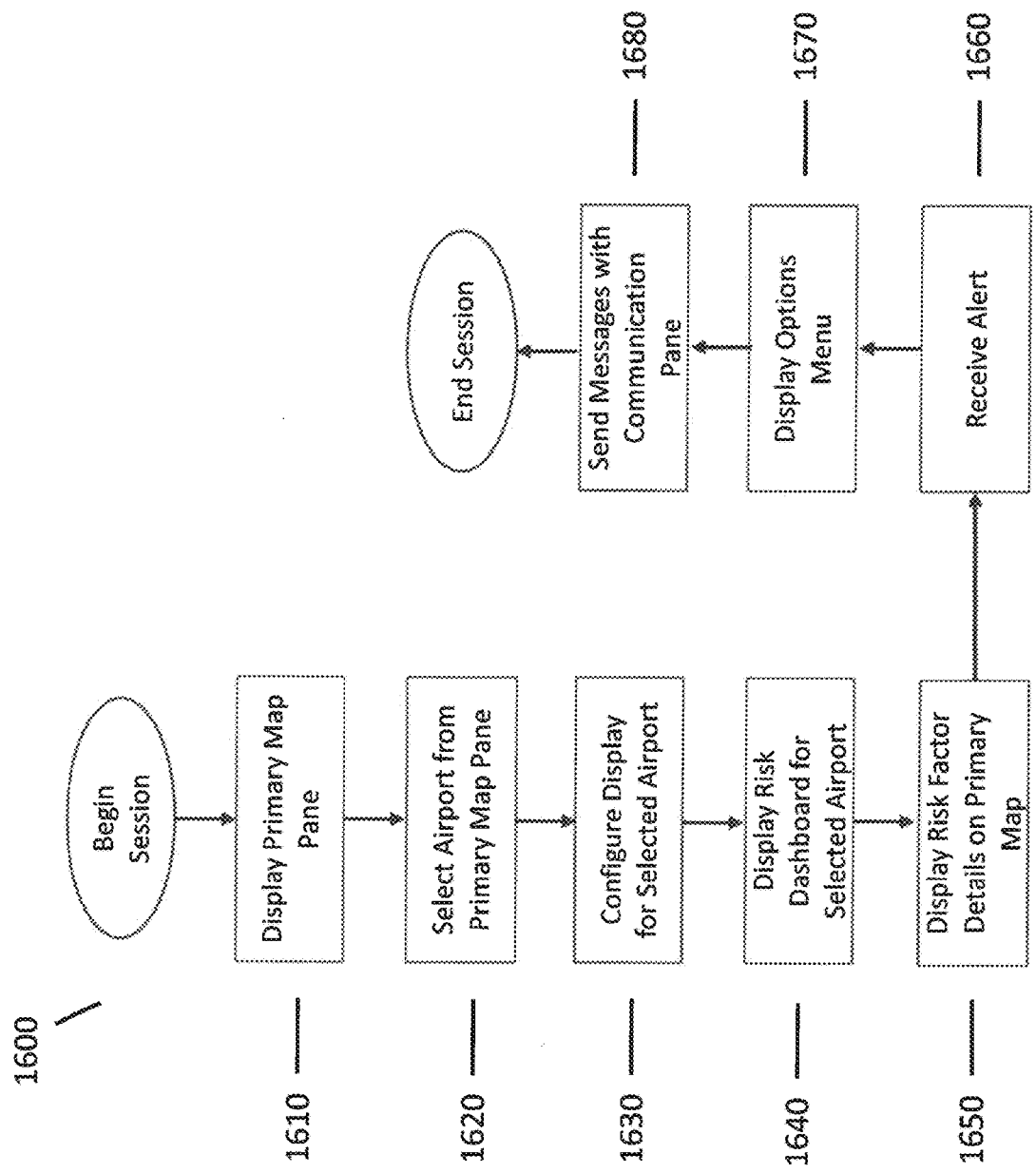
FIG. 16 is a flowchart of a process carried out by a user, according to an embodiment of the present invention.

FIG. 16 is a flowchart 1600 illustrating a process carrying out an application for predicting a terminal airspace risk category in defined time periods over a forecast time horizon, according to an embodiment of the present invention. The process 1600 begins by a user launching the application (step 1610) and displaying the primary map 120. The user selects an airport to examine from the primary map pane 120, which displays the map local to that airport and airspace and populates the application with information pertinent to that airport in step 1620. The user can then modify the primary map pane 120 by choosing which information elements to display on the primary map pane 120 in step 1630. The airspace status dashboard pane 110 automatically loads once the user selects an airport and the user can view the summary risk indicators for each defined time period on the primary map pane 110 in step 1640.

More detailed information on risk status is examined by selecting one of the defined time periods in step 1650, which then shows detailed status indicators for each risk factor during the selected time period.

At any time after selecting airport and display options, the user may receive an alert, which may be showed with the pop-up alert 160 on the primary map pane 120 or given by an auditory sound in step 1660 based on default risk criteria or user-defined preferences. In an embodiment, the user may receive an alert when the application is minimized on the user's monitor or other display device. After reviewing the pop-up alert 160, the user may examine the predicted risk factors and forecast in more detail, and decide on a response 1670. The user may choose to access the communications pane to send a message to other aviation professionals in step 1680, in some embodiments of the invention.

One skilled in the art will appreciate that a "system" could be embodied as an embedded computing system, a personal computer, a server, a console, a personal digital assistant, a tablet computer, a mobile phone, or any other suitable computing device, or combination of devices. Presenting the above-described functions as being performed by a "system" is not intended to limit the scope of the present invention in any way, but is intended to provide one example of many embodiments of the present invention. Indeed, methods, systems, and apparatuses disclosed herein may be implemented in localized and distributed forms consistent with computing technology, including cloud computing systems.

It should be noted that some of the system features described in this specification have been presented as modules, in order to emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, graphics processing units, and similar devices.

A module may also be at least partially implemented in software for execution by various types of processors. An identified unit of executable code may, for example, comprise one or more physical or logical blocks of computer instructions that may be organized as an object, procedure, function, or service. Nevertheless, the executables of an identified module need not be physically located together, but may comprise different instructions stored in different locations which, when integrated together, comprise the module and achieve the stated purpose of the module. Further, modules may be stored on a computer-readable medium, such as a hard disk drive, flash device, RAM, or any other such medium used to store data and executable software.

A module of executable code could be a single instruction, or many instructions, and may be distributed over different code segments among different programs and across several memory devices. Similarly, operational and risk factor data may be identified and illustrated herein within modules, and may be embodied in any suitable form and organized within any type of data structure. The risk factor data may be collected in a single data set, or may be distributed over different locations and different storage devices.

The computer program can be implemented in hardware, software, or a hybrid combination. The computer program can be composed of modules that are in direct communication with one another, and which are designed to pass information or instructions to display. The computer program can also be composed of modules that exchange information indirectly through a central processing hub. The computer program can be configured to operate on a general purpose computer, or any combination of computers in the same or different locations.

It will be readily understood that the components of various embodiments of the present invention, as described and illustrated in the figures herein, may be arranged and designed in a variety of different configurations. Thus, the detailed description of the embodiments of the present invention, as represented in the attached figures, is not intended to limit the scope of the invention as claimed, but is proposed as representative of selective embodiments of the invention.

The features, structures, or characteristics of the invention described throughout this specification may be combined in any suitable manner in one or more embodiments. For example, reference throughout this specification to "certain embodiments," or "current embodiment," or similar language means that a particular feature, structure, or characteristics described in connection with the embodiment is included in at least one embodiment of the present invention. Thus, phrases such as "certain embodiments," or "current embodiment," or similar language throughout this specification do not necessarily all refer to the same group of embodiments and the described features, structures, or characteristics may be combined in any suitable manner in one or more embodiments.

It should be noted that reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention can be practiced without one or more of the specific features or advantages of a particular embodiment. In other instances, additional features and advantages may be recognized in certain embodiments that may not be present in all embodiments of the invention.

One having ordinary skill in the art will readily understand that the invention as discussed above may be practiced with steps in a different order, and/or with hardware elements in configurations which are different than those which are disclosed. Therefore, although the invention has been described based upon these current embodiments, it would be apparent to those of skill in the art that certain modifications, variations, and alternative constructions would be apparent, while remaining within the spirit and scope of the invention. In order to determine the scope and bounds of the invention, therefore, reference should be made to the appended claims.

The invention claimed is:

1. A system comprising:
   one or more processors and a non-transitory computer-readable medium carrying at least one computer program, the computer program configured to:
   gather observations and forecasts of a plurality of aviation environmental and operational data of a terminal airspace;
   independently transform the observations and forecasts into respective terminal airspace risk factors;
   integrate the terminal airspace risk factors into operational time periods;
   weight the integrated terminal airspace risk factors into an overall airspace risk score for each operational time period;
   categorize the overall airspace risk score into a predicted terminal airspace risk category for each operational time period based upon at least one predetermined risk score threshold; and
   display the terminal airspace risk category for each operational time period, with each prediction updated as the observations of the plurality of aviation environmental and operational data change.

2. The system according to claim 1, wherein the weighting is adjustable based upon inputs from a user.

3. The system according to claim 1, wherein the observations and forecasts comprise:
   airport weather status;
   convective weather in the terminal airspace status;
   airport infrastructure status; and
   traffic density status.

4. The system according to claim 3, wherein:
   the airport weather status comprises:
      cloud base status, and
      visibility status; and
   the airport infrastructure status comprises:
      runway operational status, and
      instrument landing system status.

5. The system according to claim 3, wherein:
   the traffic density status comprises predicted arrival and departure counts in each sector.

6. The system according to claim 1, wherein the computer program is further configured to generate an alert in response to the overall airspace risk score being above a predetermined risk score threshold.

7. A computer-implemented method comprising:
   gathering, by a computing system, observations of a plurality of aviation environmental and operational data of a terminal airspace;
   independently transforming the observations into respective terminal airspace risk factors;
   integrating the terminal airspace risk factors into operational time periods;
   weighting the integrated terminal airspace risk factors into an overall airspace risk score for each operational time period; and
   categorizing the overall airspace risk score into a predicted terminal airspace risk category for each operational time period based upon at least one predetermined risk score threshold; and
   displaying the terminal airspace risk category for each operational time period, with each prediction updated as the observations of the plurality of aviation environmental and operational data change.

8. The computer-implemented method according to claim 7, wherein the weighting is adjustable based upon inputs from a user.

9. The computer-implemented method according to claim 7, wherein the observations and forecasts comprise:
airport weather status;
convective weather in the terminal airspace status;
airport infrastructure status; and
traffic density status.

10. The computer-implemented method according to claim 9, wherein:
the airport weather status comprises:
cloud base status, and
visibility status; and
the airport infrastructure status comprises:
runway operational status, and
instrument landing system status.

11. The computer-implemented method according to claim 9, wherein:
the traffic density status comprises predicted arrival and departure counts in each sector.

12. The computer-implemented method according to claim 7, further comprising generating an alert in response to the overall airspace risk score being above a predetermined risk score threshold.

13. A non-transitory computer readable storage medium, comprising a computer program, wherein when the computer program is run on the computing system, the computing system is enabled to perform the method according to claim 7.

14. A computer-implemented method comprising:
simultaneously displaying, by a computing system, an airspace status dashboard pane and a primary map pane on a display, wherein:
the airspace status dashboard pane showing an overall airspace risk category for each of a plurality of epochs, wherein the overall airspace risk category is based upon gathered observations of a plurality of aviation environmental and operational data of a terminal airspace; and
the primary map pane showing a map of the terminal airspace and surrounding geographical area,
the primary map pane including at least one map overlay, each map overlay showing a selected independent risk factor observation for an operational time period used to predict the overall airspace risk category.

15. The computer-implemented method according to claim 14, wherein the primary map pane further displays predicted runway status, ILS status, airport visibility, and airport cloud base for the operational time period.

16. The computer-implemented method according to claim 14, wherein the primary map pane further selectively displays at least one of a clickable wind button that causes recent reports of airport ground wind speed and direction information to be displayed as the at least one map overlap, a clickable special air space (SUA) button that causes SUA polygons to be displayed, a clickable significant meteorological event (SIGMET) button that causes SIGMET polygons to be displayed, and a clickable weather radar button that causes weather radar images to be displayed.

17. The computer-implemented method according to claim 14, wherein the primary map pane further selectively displays:
a clickable Gate Forecast button that causes airspace sectors to be displayed, color-coded to indicate the probability of disruption from convective weather;
a clickable Arrival Traffic button that causes a table with predicted aircraft traffic for arrival sectors to be displayed; and
a clickable Departure Traffic button that causes a table with predicted departing aircraft counts for departure sectors to be displayed.

18. The computer-implemented method according to claim 14, wherein the airspace status pane further shows the airport risk category for each of a plurality of operational time periods.

19. The computer-implemented method according to claim 14, wherein the airport status dashboard pane includes a feature enabling a user to click on one of the operational time periods and display a list of risk factor statuses of corresponding ones of the observations within the selected time period.

20. The computer-implemented method according to claim 14, wherein the primary map pane further comprises an alert feature to indicate that the overall airspace risk score exceeds a predetermined threshold.

21. A non-transitory computer readable storage medium, comprising a computer program, wherein when the computer program is run on the computing system, the computing system is enabled to perform the method according to claim 14.

22. A system comprising:
one or more processors and a non-transitory computer-readable medium carrying at least one computer program, the computer program configured to:
simultaneously display an airspace status dashboard pane and a primary map pane on a display, wherein:
the airspace status dashboard pane showing an overall airspace risk category for each of a plurality of epochs, wherein the overall airspace risk category is based upon gathered observations of a plurality of aviation environmental and operational data of a terminal airspace; and
the primary map pane showing a map of the terminal airspace and surrounding geographical area, and
the primary map pane including at least one map overlay, each map overlay showing a selected independent risk factor observation for an operational time period used to predict the overall airspace risk category.

23. The system according to claim 22, wherein the primary map pane further displays predicted runway status, ILS status, airport visibility, and airport cloud base for the operational time period.

24. The system according to claim 22, wherein the primary map pane further selectively displays at least one of a clickable wind button that causes recent reports of airport ground wind speed and direction information to be displayed as the at least one map overlap, a clickable SUA button that causes SUA polygons to be displayed, a clickable SIGMET button that causes SIGMET polygons to be displayed, and a clickable weather radar button that causes weather radar images to be displayed.

25. The system according to claim 22, wherein the primary map pane further selectively displays:
a clickable Gate Forecast button that causes airspace sectors to be displayed, color-coded to indicate the probability of disruption from convective weather;
a clickable Arrival Traffic button that causes a table with predicted aircraft traffic for arrival sectors to be displayed; and
a clickable Departure Traffic button that causes a table with predicted departing aircraft counts for departure sectors to be displayed.

26. The system according to claim 22, wherein the airspace status pane further shows the airport risk category for each of a plurality of operational time periods.

27. The system according to claim 22, wherein the airport status dashboard pane includes a feature enabling a user to click on one of the operational time periods and display a list of risk factor statuses of corresponding ones of the observations within the selected time period.

28. The system according to claim 22, wherein the primary map pane further comprises an alert feature to indicate that the overall airspace risk score exceeds a predetermined threshold.

* * * * *